United States Patent [19]

Boggs et al.

[11] 4,087,136
[45] May 2, 1978

[54] TRACK-TYPE VEHICLE WHEEL HAVING CONTROLLED IMPACT RESISTANCE

[75] Inventors: Roger L. Boggs, East Peoria, Ill.; John W. Sogge, Cedar Rapids, Iowa

[73] Assignee: Caterpillar Tractor Co., Peoria, Ill.

[21] Appl. No.: 712,566

[22] Filed: Aug. 9, 1976

[51] Int. Cl.² .............................................. B62D 55/12
[52] U.S. Cl. .................................... 305/57; 74/243 R; 267/182
[58] Field of Search .................. 305/57, 56, 21, 24, 305/28, 5; 301/51; 267/182; 74/443, 229, 243 R

[56] References Cited

U.S. PATENT DOCUMENTS

| 1,046,969 | 12/1912 | Chaloner | 301/51 X |
| 3,889,550 | 6/1975 | Boggs et al. | 74/443 |

*Primary Examiner*—Stanley H. Tollberg
*Assistant Examiner*—John P. Shannon
*Attorney, Agent, or Firm*—Frank L. Hart

[57] ABSTRACT

A wheel of a driven track of a track-type vehicle has a rim connected to a hub with an annular chamber formed between the rim and the hub. A plurality of annular springs are positioned in the chamber and actuated by plungers in response to contacting a portion of the track. The springs controllably resist the impact forces of the track that are directed onto the wheel.

8 Claims, 5 Drawing Figures

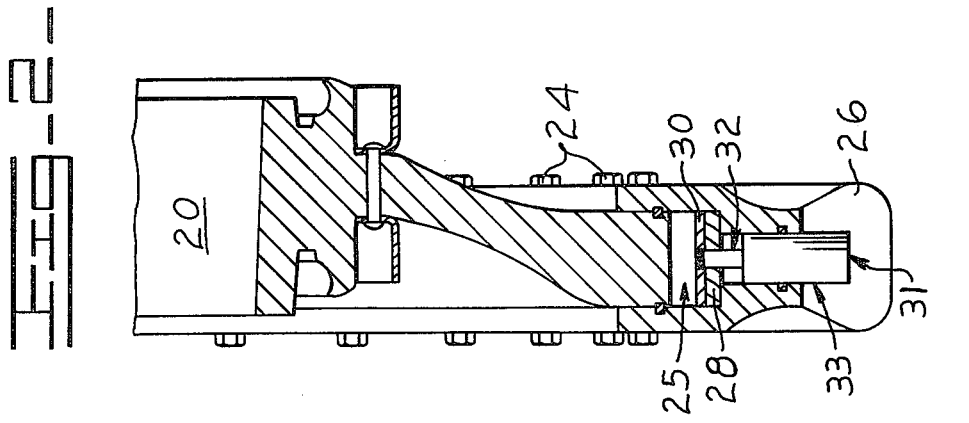
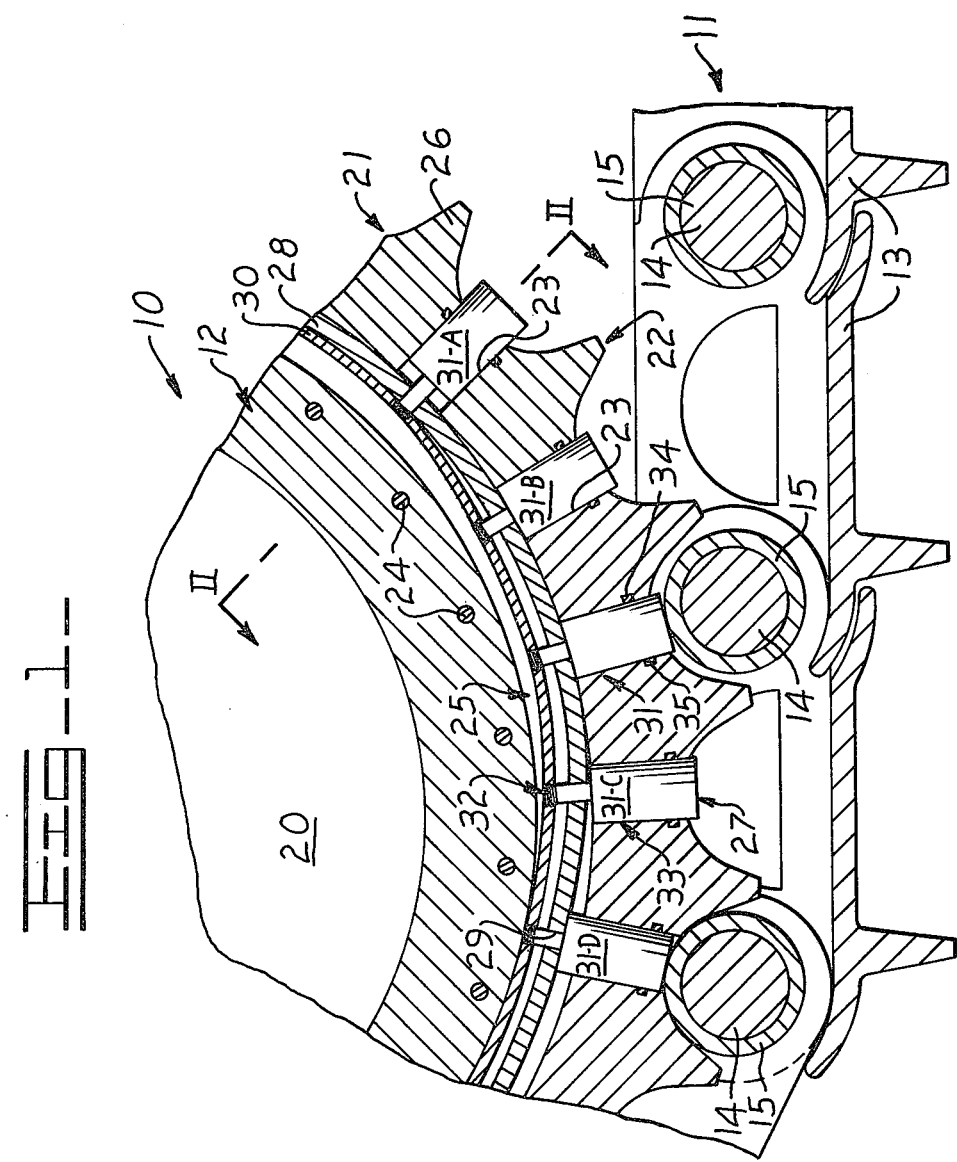

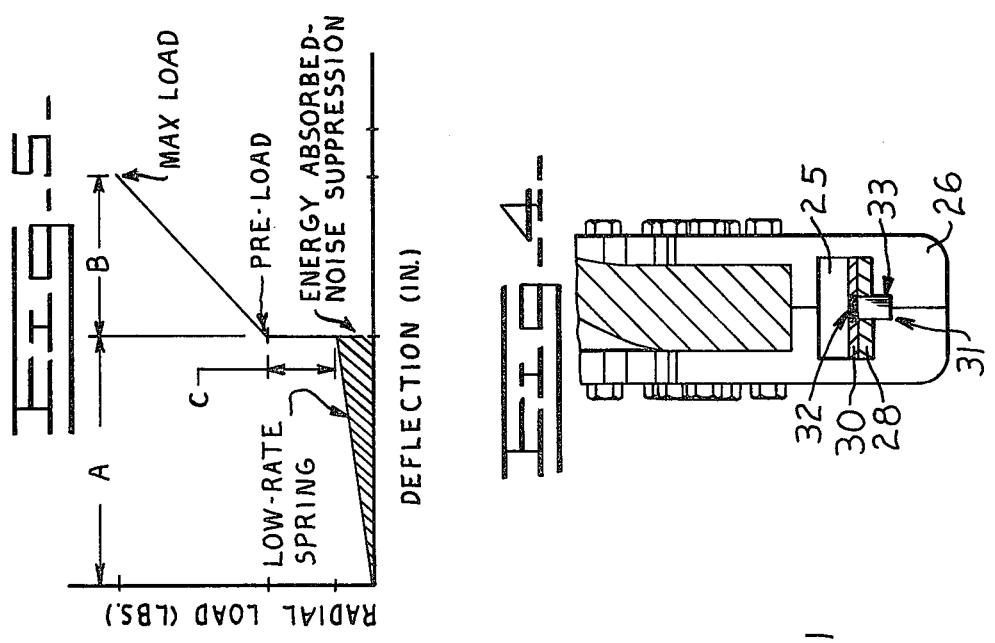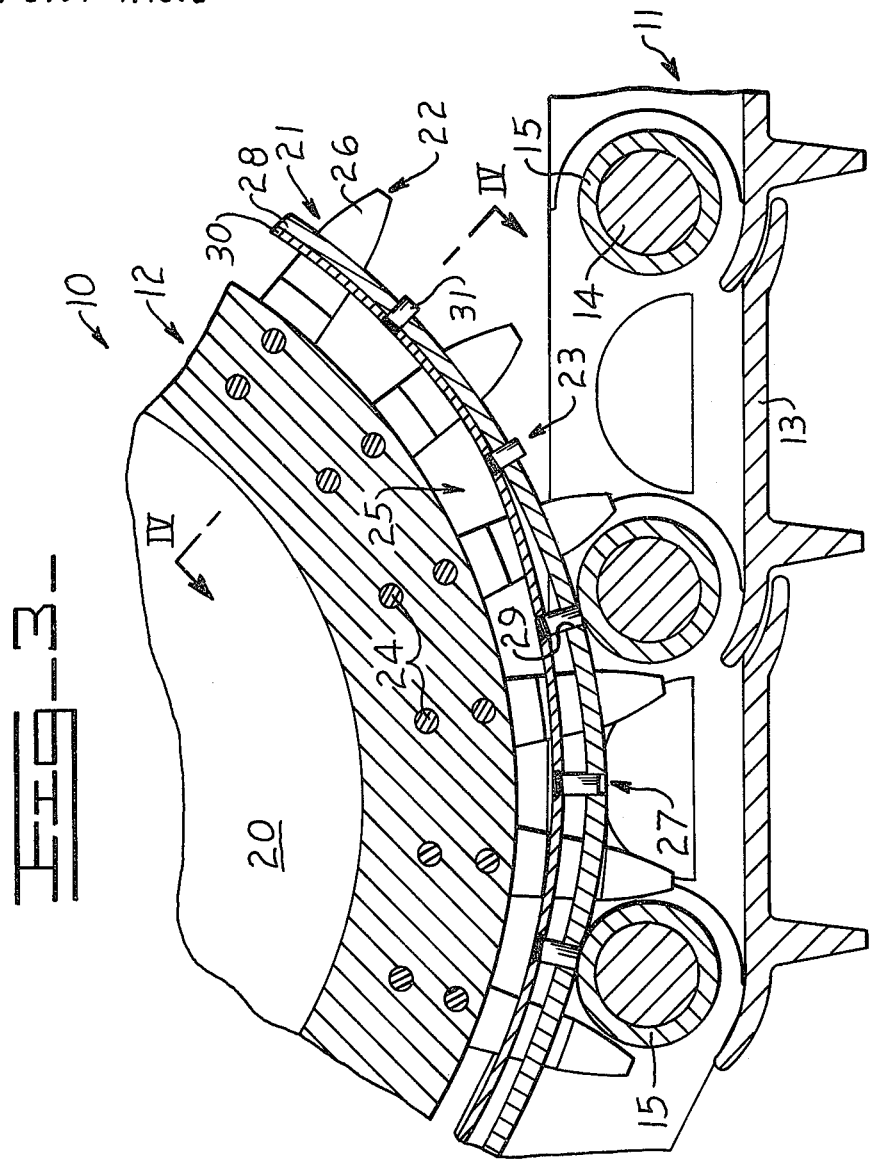

4,087,136

TRACK-TYPE VEHICLE WHEEL HAVING CONTROLLED IMPACT RESISTANCE

BACKGROUND OF THE INVENTION

In the operation of track-type vehicles, the track impacts the sprocket and other wheels of the track assembly with relatively large forces. These impact forces cause an undesirable amount of noise. These impact forces and associated loads are also responsible for waste of labor and time in replacing elements of the track at undesirably high frequency and subjecting the operator and bystanders to an undesirable magnitude of sound impact. By reducing the impact loads by the apparatus of this invention, the track elements can be worn to a greater magnitude before replacement is necessary.

This invention therefore resides in apparatus fo controllably resisting the impact forces on the track assembly wheels in response to operation of the track.

BRIEF DESCRIPTION OF THE DRAWINGS

FIG. 1 is a diagrammatic side view in partial section of a portion of a work vehicle having the apparatus of this invention;

FIG. 2 is a diagrammatic sectional view taken along line II—II of FIG. 1;

FIG. 3 is a diagrammatic side view in partial section of a portion of a work vehicle having another embodiment of the apparatus of this invention;

FIG. 4 is a diagrammatic sectional view taken along line IV—IV of FIG. 3; and

FIG. 5 is a force vs. deflection curve of an example apparatus of this invention.

DETAILED DESCRIPTION OF THE INVENTION

Referring to FIG. 1, a work vehicle 10, for example a crawler tractor, has a continuous track 11 driven by a sprocket wheel 12 and being supported by an idler wheel and other wheels (not shown). The continuous track 11 is formed of a plurality of track shoes 13 interconnected by pins 14 that are covered by bushings 15. These elements are well known in the art as are the impact forces subjected onto the wheels 12 by the track 11. It should be understood, however, that the wheels of this invention can be any of the wheels of the track assembly and, for purposes of brevity, a sprocket wheel 12 is the only wheel down.

The wheel 12 has a hub 20 connected to a rim 21 and to the power train (not shown) of the vehicle 10. The rim 21 has an outer surface 22 and a plurality of generally radially extending openings 23. The rim 21 is connected to the hub 20 by fasteners 24 and is of a configuration or construction sufficient to provide a generally coaxial annular chamber 25 defined by said hub 20 and rim 21. The generally radially extending openings 23 of the rim 21 open into said chamber 25.

Where the wheel 12 is a sprocket wheel, as shown in the drawings, the outer surface of the wheel 12 has a plurality of arcuately spaced apart teeth 26. The teeth 26 are spaced one from the other by an intervening root area. In the embodiment of FIGS. 1 and 2, the generally radially extending openings 23 of the rim 21 open on the root area 27. In the embodiment of FIGS. 3 and 4, the openings 23 likewise open on the area 27 between the teeth 26 but said openings 23 are of a larger size as hereafter more fully described.

A first annular spring assembly 28 is positioned in the chamber 25 and is of a size sufficient for forcibly urging against the rim 21. The first spring assembly preferably has a plurality of generally radially extending openings 29 that are generally coaxial with the openings 23 of the rim 21. In another embodiment of the first spring assembly 28 (not shown), said opening assembly 28 can be formed of two separate coaxial springs positioned side by side and spaced one from the other with said space providing said openings 29.

A second annular spring 30 is positioned in the chamber 25 and is of a size sufficient for forcibly urging against the first annular spring assembly 20. The first annular spring 28 is of a size sufficient for forcibly urging against the rim 21 and is therefore preloaded. As shown, the springs 28,30 are generally coaxial with the hub 20 with said second spring 30 being positioned between said first spring assembly 28 and said hub 20.

The springs 28,30 are of a construction sufficient for requiring a greater force to move a portion of the first spring assembly 28 toward the hub 20 than the force required to move a portion of the second spring 30 toward the hub 20. This construction can be easily provided by forming the first spring assembly 28 with a thickness "T" that is greater than the thickness "t" of the second spring 30.

A plunger 31 is provided for each of the openings 23 of the rim 21. Each of the plungers 31 have first and second end portions 32,33. The first end portion 32 is of a size sufficient for extending through the associated opening 29 of the first spring assembly 28 in slidable relationship thereto. The second end portion 33 is of a size sufficient for extending through the associated opening 23 of the rim 21 in slidable relationship thereto.

The plungers 31 are each movable into and from the wheel chamber 25 and are controllably biased outwardly to the position of plunger 31-A by the second spring 30. The plungers 31 are preferably connected to the second spring 30 by any means known in the art for maintaining said plungers 31 with said second spring 30.

The first end portion of each plunger is of a length greater than the thickness "T" of the first annular spring assembly 28. The first and second end portions 32,33 of each plunger are of respective length and construction sufficient for biasing portions of only the second spring 30 toward the hub 20 in response to initial movement of the plunger 31 toward the hub 20 (see 31-B) and thereafter biasing portions of both springs 28,30 toward the hub 20 in response to further movement of the plunger 31 toward said hub 20 (see 31-C). At the fully inserted position of the plunger 31 by the track 11, as shown by plunger 31-D, portions of both springs 28,30 are biased toward the hub 20 by a track pin bushing 15 and the outer end of the plunger 31-D is adjacent the associated root area 27.

FIGS. 1 and 2 show a plunger 31 having a second end portion larger than the associated spring 29 of the first spring assembly 28 for contacting and moving said assembly 28 therewith. FIGS. 3 and 4 show a plunger 31 of generally columnar configuration and is constructed for biasing of the first spring assembly in response to and by direct contact with the bushing 15, as opposed to biasing contact with an enlarged second end portion 33 of the plunger 31 as in FIGS. 1 and 2.

An annular groove 34 can also be formed around each generally radially extending rim opening 23 and an O-ring 35 can be positioned in each groove for sealing the annulus between the plunger 31 and rim 21 for preventing foreign material from entering the chamber 25 and obstructing flexure of the springs 28,30.

In the operation of the apparatus, the track bushing 15 contacts the plunger 31 and biases the plunger 31 toward the hub 20. This biasing force on the plunger 31 is first resisted by the force of the first spring 30, thereby preventing the track 11 from slapping wheel 10 with resultant undesirable noise. Further movement of the track 11 toward the hub 20 in response to higher than normal loading causes portions of the second spring assembly to be biased toward the hub 20 with resultant greater resistance being exerted against movement of the track 11 toward said hub 20. The second spring resisting forces thereby function to drastically reduce bushing impact loads which sometimes cause crushing and damage of the bushings 15. In some constructions, impact loads of the track 11 are expected to be reduced by about 50% by the apparatus of this invention.

FIG. 5 shows a force vs. deflection curve which illustrates the force and second spring deflection "A" and the forces required for resultant deflection of the first spring "B". This assembly therefore has a dual spring rate. As can be seen, additional forces "C" of a preselected magnitude "C" are required prior to the initial biasing of the first spring after the second spring is fully deflected. This construction enables the track and sprocket to maintain a matched relationship during normal operations. The resisting force "C" is provided by preloading spring 28, as set forth above.

Other aspects, objects, and advantages of this invention can be obtained from a study of the drawings, the disclosure, and the appended claims.

We claim:

1. A wheel of a track-type vehicle, comprising:
   a hub;
   a rim having an outer surface and a plurality of generally radially extending openings and being connected to the hub;
   an annular chamber defined by said rim and said hub, said openings of the rim opening into said chamber;
   a first annular spring assembly having a plurality of generally radially extending openings generally coaxial with said rim openings, said first annular spring being positioned in said chamber adjacent the rim;
   a second annular spring being positioned in said chamber and forcibly urging against the first annular spring assembly; and
   a plurality of plungers, each having a first end portion extending through an associated opening of the first annular spring assembly and a second end portion extending through an associated opening of the rim, said plungers being movable into and from the wheel chamber and controllably biased outwardly by the second spring.

2. Apparatus, as set forth in claim 1, wherein the first end portion of each plunger has a length greater than the thickness of the first annular spring assembly.

3. Apparatus, as set forth in claim 1, wherein the first and second annular springs each has a construction sufficient to require a greater force to move a portion of the first spring assembly toward the hub than the force required to move a portion of the second spring toward the hub.

4. Apparatus, as set forth in claim 1, including:
   an annular groove formed about each generally radially extending rim opening; and
   an O-ring positioned in each annular groove for sealing the annulus between the plunger and the rim.

5. Apparatus, as set forth in claim 1, including:
   teeth positioned about the outer periphery of said rim and being arcuately spaced one from the other by a root area and wherein the plurality of generally radially extending openings of the rim open onto the root area of the rim.

6. Apparatus, as set forth in claim 5, wherein the second end portion of each plunger has a length sufficient for biasing adjacent portions of the annular springs preselected distances toward the hub in response to movement of a second end of the plunger to a location adjacent the associated root area.

7. Apparatus, as set forth in claim 1, wherein the first end of each plunger is connected to the second annular spring.

8. Apparatus, as set forth in claim 1, wherein the first end portion of each plunger has a length sufficient for biasing a portion of the second annular spring a preselected distance toward the hub prior to contacting the first annular spring with the second end portion of said plunger.

* * * * *